(12) United States Patent
Shinohara

(10) Patent No.: US 12,233,980 B2
(45) Date of Patent: Feb. 25, 2025

(54) ACCELERATOR POSITION SENSOR UNIT AND THROTTLE GRIP APPARATUS

(71) Applicant: TOYO DENSO KABUSHIKI KAISHA, Tokyo (JP)

(72) Inventor: Hiroyuki Shinohara, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 308 days.

(21) Appl. No.: 17/881,697

(22) Filed: Aug. 5, 2022

(65) Prior Publication Data

US 2023/0062374 A1    Mar. 2, 2023

(30) Foreign Application Priority Data

Aug. 24, 2021 (JP) ................. 2021-136426

(51) Int. Cl.
*B62J 45/422* (2020.01)
*B62J 45/413* (2020.01)
*B62K 23/04* (2006.01)

(52) U.S. Cl.
CPC .......... *B62J 45/413* (2020.02); *B62J 45/422* (2020.02); *B62K 23/04* (2013.01)

(58) Field of Classification Search
CPC ........ B62J 45/413; B62J 45/422; B62K 23/04
See application file for complete search history.

(56) References Cited

U.S. PATENT DOCUMENTS 7,950,367 B2 *   5/2011   Yoshizawa .............   B62K 23/04
                                                      123/376
2007/0084658 A1   4/2007   Yamazaki et al.

FOREIGN PATENT DOCUMENTS

| JP | 2002256904 A | * | 9/2002 | ............. F02D 11/02 |
|---|---|---|---|---|
| JP | 4414389 B2 | | 2/2010 | |
| JP | 2017081384 A | * | 5/2017 | |
| JP | 6329573 B2 | | 5/2018 | |
| JP | 2020196388 A | * | 12/2020 | |
| JP | 2021066194 A | * | 4/2021 | |
| JP | 7263205 B2 | * | 4/2023 | |
| WO | WO-02068804 A1 | * | 9/2002 | ............. F02D 11/02 |
| WO | 2005/108197 A1 | | 11/2005 | |

(Continued)

OTHER PUBLICATIONS

Official Communication issued in corresponding European Patent Application No. 22187319.3, mailed on Dec. 21, 2022.

*Primary Examiner* — Andre J Allen
(74) *Attorney, Agent, or Firm* — Keating & Bennett, LLP

(57) ABSTRACT

An accelerator position sensor unit capable of not only easily performing positioning of the accelerator position sensor unit with respect to a handlebar but also stably fixing the accelerator position sensor unit to the handlebar with a simple configuration. An accelerator position sensor unit 1 includes an accelerator position sensor main body 3 that detects a rotation angle of a throttle pipe 12 supported by a cylindrical handlebar 11 in a state of being rotatable around a central axis O11 of the handlebar 11 along an outer circumference surface 111 of the handlebar 11, and a sensor case 4 that houses the accelerator position sensor main body 3. The sensor case 4 includes an extending portion 53 extending along a direction of the central axis O11. The extending portion 53 is sandwiched between the handlebar 11 and a cover 7 that covers the accelerator position sensor unit 1.

8 Claims, 8 Drawing Sheets

(56) References Cited

FOREIGN PATENT DOCUMENTS

| WO | WO-2009124907 A1 | * | 10/2009 | ............. | B62K 23/04 |
| WO | 2020/178861 A2 | | 9/2020 | | |
| WO | WO-2021214791 A1 | * | 10/2021 | ............. | B62J 11/13 |

* cited by examiner

ACCELERATOR POSITION SENSOR UNIT AND THROTTLE GRIP APPARATUS

BACKGROUND OF THE INVENTION

Field of the Invention

The present invention relates to an accelerator position sensor unit and a throttle grip apparatus.

Description of the Related Art

In general, a throttle pipe is rotatably supported relative to an outer circumference of a handlebar of a vehicle. Further, a rotation angle of the throttle pipe is detected by a detection sensor (an accelerator position sensor unit) (see, for example, Japanese Patent No. 6329573 and Japanese Patent No. 4414389). In a technique disclosed in Japanese Patent No. 6329573, an opening degree sensor functioning as the detection sensor is fixed to the handlebar via a set plate that holds the handlebar. Furthermore, in a technique disclosed in Japanese Patent No. 4414389, a throttle operation amount sensor functioning as the detection sensor is fixed to the handlebar via an attaching member that covers the throttle operation amount sensor.

In both the technique disclosed in Japanese Patent No. 6329573 and the technique disclosed in Japanese Patent No. 4414389, the detection sensor is not fixed directly to the handlebar, but is fixed to the handlebar via another predetermined member. However, in such a fixing configuration, since the detection sensor is fixed to the handlebar via another predetermined member, it becomes difficult to perform accurate positioning of the detection sensor with respect to the handlebar. In addition, when the throttle pipe is operated, it becomes easy to wobble. As a result, it becomes difficult to accurately detect the rotation angle of the throttle pipe.

SUMMARY OF THE INVENTION

The present invention provides an accelerator position sensor unit and a throttle grip apparatus that are capable of not only easily performing positioning of the accelerator position sensor unit with respect to a handlebar but also stably fixing the accelerator position sensor unit to the handlebar with a simple configuration.

Accordingly, an aspect of the present invention is to provide an accelerator position sensor unit comprising an accelerator position sensor main body that detects a rotation angle of a throttle pipe supported by a cylindrical handlebar in a state of being rotatable around a central axis of the handlebar along an outer circumference surface of the handlebar, and a sensor case that houses the accelerator position sensor main body. The sensor case includes an extending portion extending along a direction of the central axis. The extending portion is sandwiched between the handlebar and a cover that covers the accelerator position sensor unit.

According to the present invention, with the simple configuration, it is possible to not only easily perform the positioning of the accelerator position sensor unit with respect to the handlebar but also stably fix the accelerator position sensor unit to the handlebar.

Further features of the present invention will become apparent from the following description of exemplary embodiments with reference to the attached drawings.

DESCRIPTION OF THE EMBODIMENTS

Hereinafter, respective embodiments of the present invention will be described in detail with reference to the drawings. However, configurations described in the following respective embodiments are merely examples, and the scope of the present invention is not limited by the configurations described in the following respective embodiments.

First, a first embodiment of the present invention will be described with reference to FIGS. 1 to 5.

Figure 1:
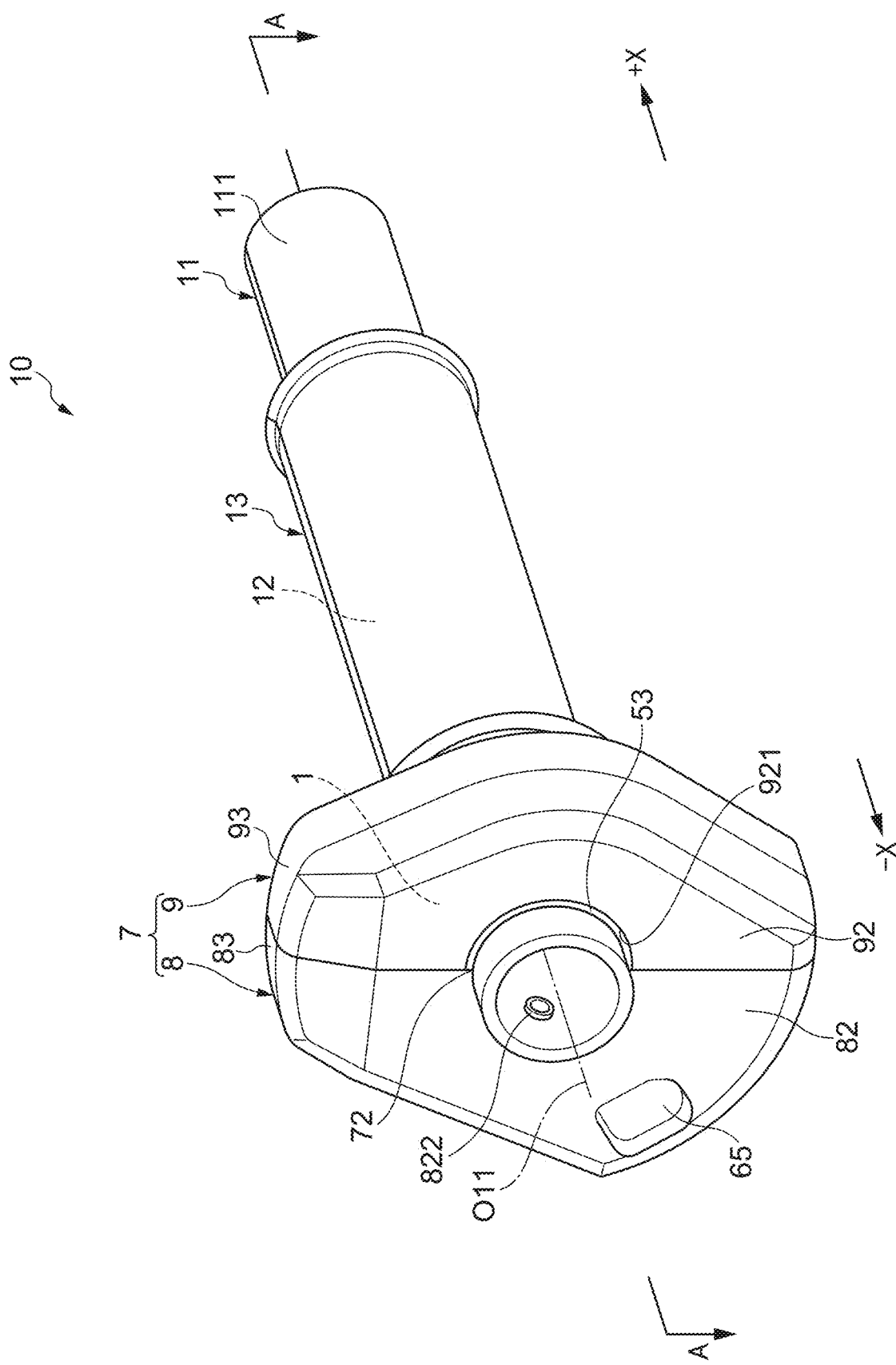
FIG. 1 is a perspective view that shows a throttle grip apparatus according to a first embodiment of the present invention.
Figure 2:
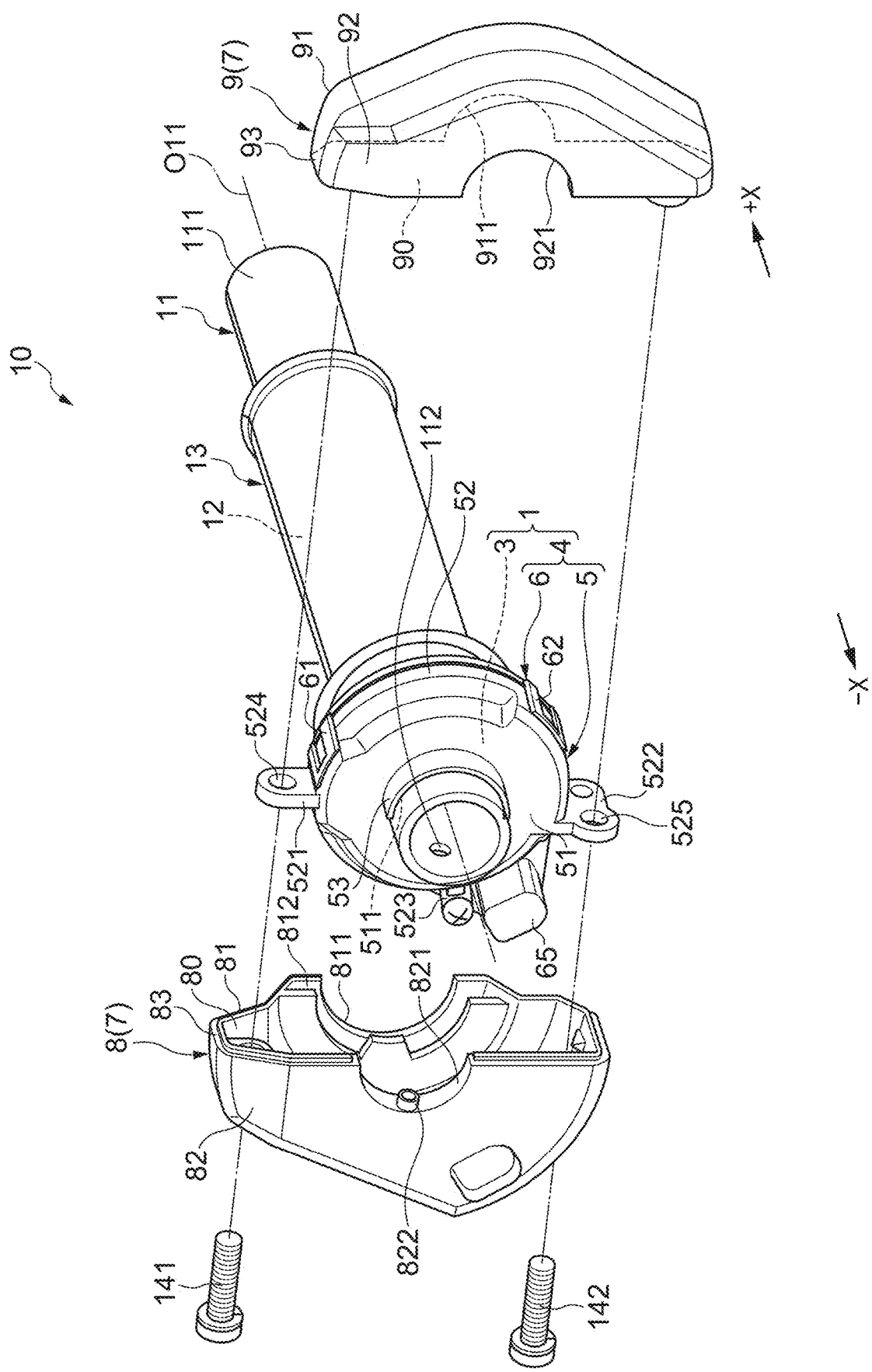
FIG. 2 is an exploded perspective view of the throttle grip apparatus shown in FIG. 1.

A throttle grip apparatus 10 shown in FIG. 1 is able to be applied to various types of vehicle bodies such as a motorcycle provided with a handlebar. It should be noted that the throttle grip apparatus 10 is not limited to the case where it is applied to a motorcycle, but may also be applied to saddle riding type vehicles which include vehicles other than motorcycles. "The saddle riding type vehicles" include all vehicles that a rider straddles the vehicle body when riding. That is, "the saddle riding type vehicles" include not only motorcycles (also including motorized bicycles) but also three-wheel vehicles and four-wheel vehicles that are classified as ATVs (All Terrain Vehicles) or irregular ground traveling vehicles, and snowmobiles. Further, the throttle grip apparatus 10 is also able to be applied to marine vessels such as water motorcycles (personal watercrafts). In the first embodiment of the present invention, as one example of the throttle grip apparatus 10, a throttle grip apparatus for the right side is illustrated. Furthermore, in FIGS. 1 to 4, the left side of the figure is a vehicle body center side (a −X side), and the right side of the figure is a vehicle body outside (a +X side). As shown in FIG. 2, the throttle grip apparatus 10 includes a handlebar 11, an accelerator position sensor unit (hereinafter, simply referred to as "an APS unit") 1 that is fixed to the handlebar 11, and a cover 7 that covers the APS unit 1. In addition, the throttle grip apparatus 10 further includes a throttle pipe 12 that is coupled to the +X side of the APS unit 1, and a grip member 13 that covers the throttle pipe 12.

The handlebar 11 is configured by a cylindrical member. The handlebar 11 has a linear shape in the first embodiment of the present invention, but is not limited to this, and for example, may be curved in the middle of a longitudinal direction. Further, an outer diameter of the handlebar 11 is constant in the first embodiment of the present invention, but the outer diameter of the handlebar 11 is not limited to this, and for example, may be changed, that is, the outer diameter of the handlebar 11 may be expanded or reduced.

Figure 4:
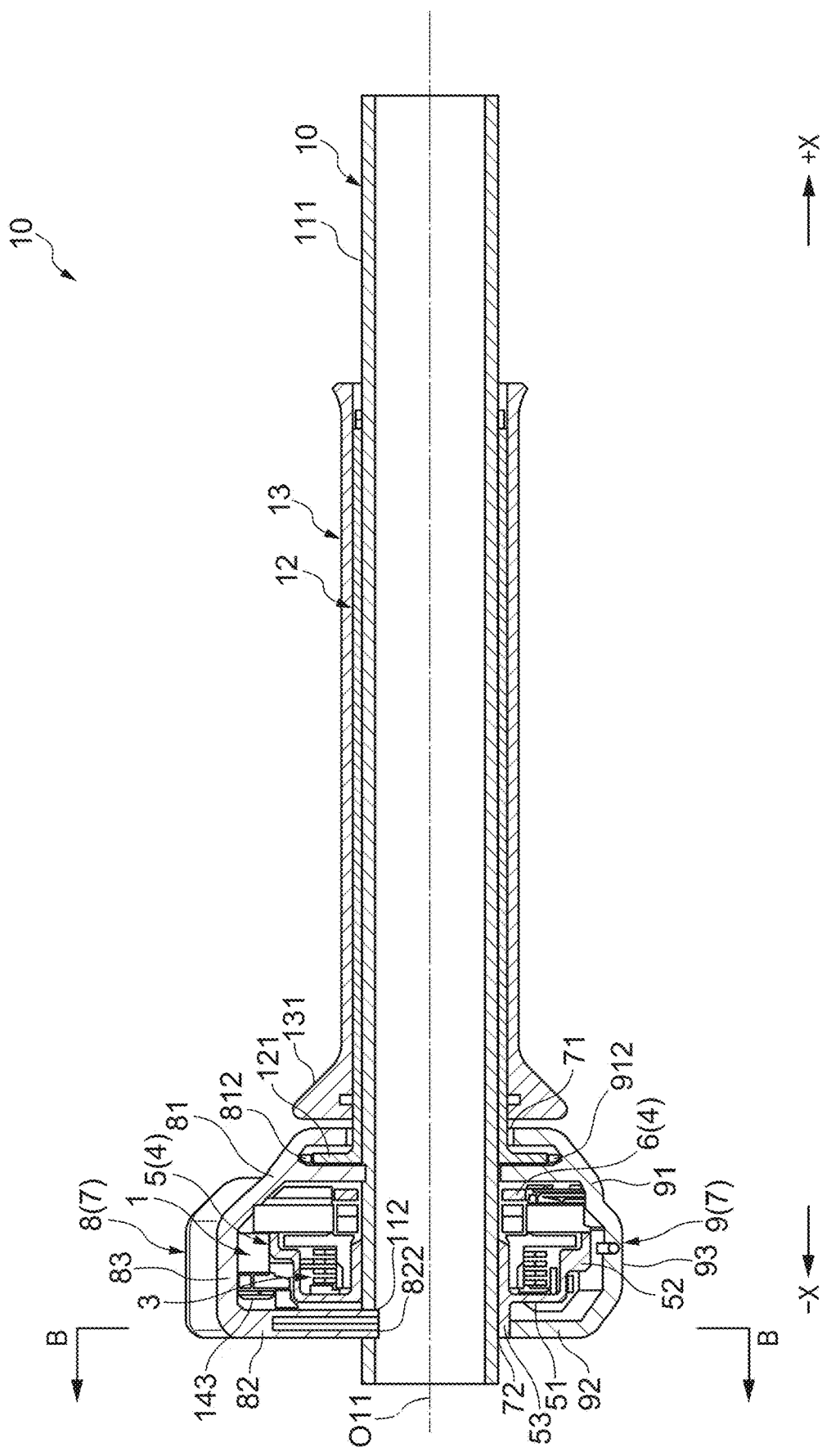
FIG. 4 is a sectional view (a longitudinal sectional view) taken along a line A-A of FIG. 1.

As shown in FIG. 4, as with the handlebar 11, the throttle pipe 12 and the grip member 13 are each configured by a cylindrical member. Further, the throttle pipe 12 and the grip member 13 are disposed concentrically with the handlebar 11 with a central axis O11 of the handlebar 11 as the center. The throttle pipe 12 is supported by the handlebar 11 in a state of being rotatable around the central axis O11 of the handlebar 11 along an outer circumference surface 111 of the handlebar 11. Further, a flange portion 121 is formed at an end portion on the –X side of the throttle pipe 12. Moreover, the flange portion 121 engages with the cover 7, and functions as a retainer that prevents the throttle pipe 12 from coming off from the handlebar 11. As a result, a state, in which the throttle pipe 12 and the APS unit 1 are coupled, is maintained. The grip member 13 is coupled and fixed to an outer circumference side of the throttle pipe 12. The grip member 13 is gripped by a driver who drives the vehicle body and is operated by the driver so as to rotate around the central axis O11, thus the grip member 13 rotates together with the throttle pipe 12. A rotation angle of the throttle pipe 12 is detected by the APS unit 1 that will be described later. Further, a tapered portion 131 whose outer diameter gradually increases toward the –X side is formed at an end portion on the –X side of the grip member 13. The tapered portion 131 is able to reduce a step (an outer diameter difference) between the grip member 13 and the cover 7.

Figure 3:
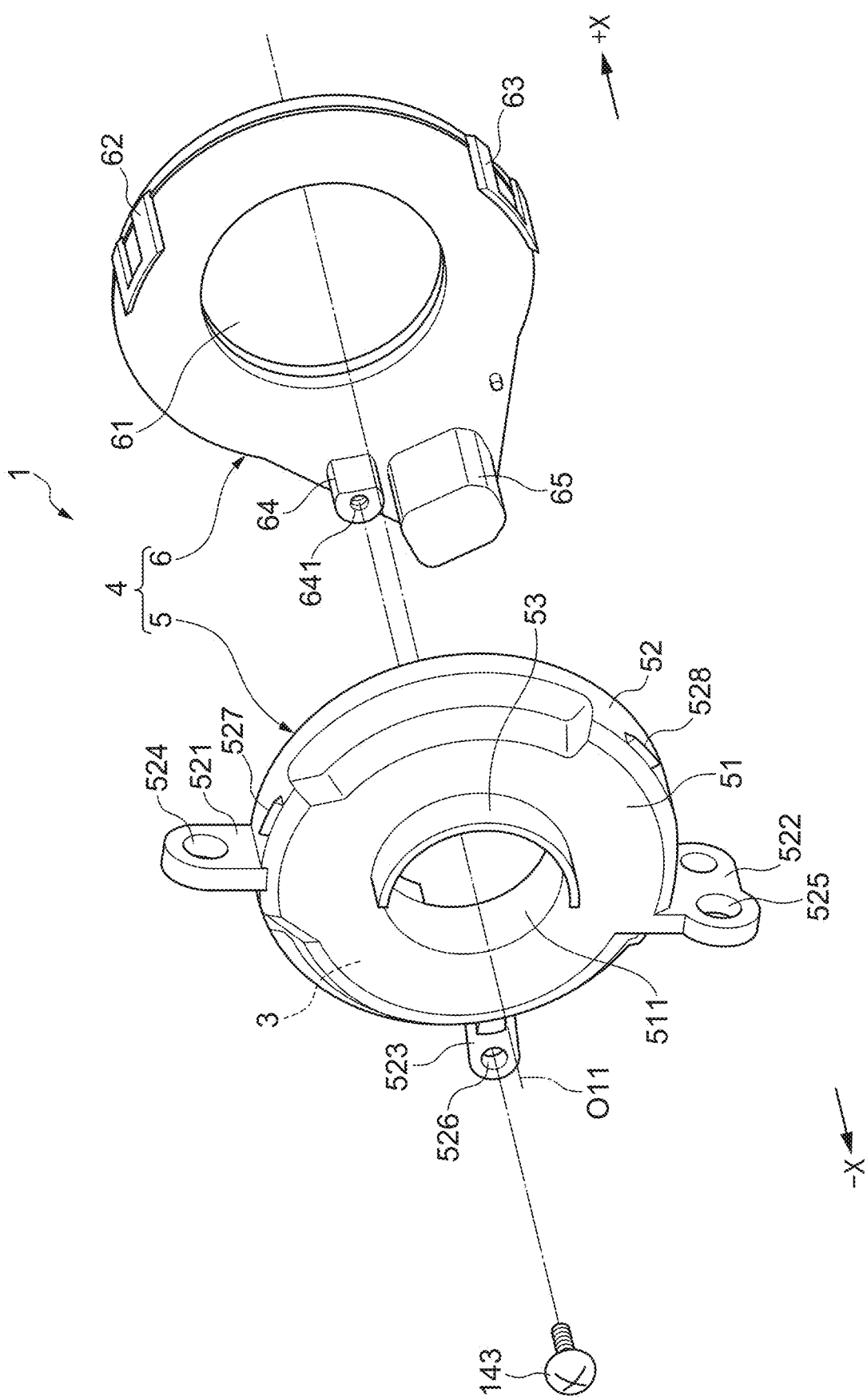
FIG. 3 is an exploded perspective view of an accelerator position sensor unit that is included in the throttle grip apparatus shown in FIG. 1.

As shown in FIGS. 2 and 3, the APS unit 1 includes an accelerator position sensor main body (hereinafter, simply referred to as "an APS main body") 3, and a sensor case 4 that houses the APS main body 3. The APS main body 3 is coupled to the –X side of the throttle pipe 12. Further, when the grip member 13 and the throttle pipe 12 are operated by the driver so as to rotate around the central axis O11, the APS main body 3 is able to detect the rotation angle of the throttle pipe 12 rotating around the central axis O11. An opening degree of a throttle valve (not shown) of the vehicle body is adjusted according to the magnitude of this rotation angle. Moreover, the APS main body 3 may be configured by, for example, a magnetic sensor which has a Hall element. As a result, a detection result obtained by the APS main body 3, that is, the rotation angle detected by the APS main body 3 is transmitted to a control system of the vehicle body as an electric signal.

As shown in FIG. 3, the sensor case 4 includes a case main body 5, and a lid body 6 that is attached to the case main body 5. The case main body 5 includes a ring-shaped portion 51 that has a ring shape, and a side wall portion 52 that is formed along an edge portion of the ring-shaped portion 51. The handlebar 11 is able to be inserted through a through hole 511, which is formed at the central part of the ring-shaped portion 51. Further, the side wall portion 52 includes a protruding portion 521 protruding upward, a protruding portion 522 protruding downward, and a protruding portion 523 protruding toward the front of the vehicle body. A through hole 524 that penetrates in a front-rear direction of the vehicle body is formed at the protruding portion 521. A screw 141, which will be described later, is inserted through the through hole 524 (see FIG. 2). Further, a through hole 525 that penetrates in the front-rear direction of the vehicle body is formed at the protruding portion 522. A screw 142, which will be described later, is inserted through the through hole 525 (see FIG. 2). Furthermore, a through hole 526 that penetrates in a direction of the central axis O11 is formed at the protruding portion 523. A screw 143, which will be described later, is inserted through the through hole 526 (see FIG. 3).

The lid body 6 has a ring shape, and the handlebar 11 is able to be inserted through a through hole 61, which is formed at the central part of the lid body 6. The lid body 6 includes an engaging piece 62 and an engaging piece 63 that are formed so as to protrude from an edge portion of the lid body 6, and a boss 64 that is formed so as to protrude from a surface facing the –X side. All of the engaging piece 62, the engaging piece 63, and the boss 64 protrude toward the –X side. Further, the engaging piece 62, the engaging piece 63, and the boss 64 are disposed around the central axis O11 at substantially equal angular intervals. Furthermore, the engaging piece 62 engages with a convex portion 527, which is formed on the side wall portion 52 of the case main body 5. The engaging piece 63 engages with a convex portion 528, which is formed on the side wall portion 52 of the case main body 5. A female screw 641 is formed on the boss 64, and the screw 143, which has been inserted through the through hole 526 of the case main body 5, is screwed into the female screw 641. By such engagement and screwing, the lid body 6 is able to be attached from the +X side of the case main body 5. Further, the APS main body 3 is housed and disposed within a space surrounded by the case main body 5 and the lid body 6. Furthermore, the lid body 6 is provided with a coupler 65 that has an electric terminal. By connecting the coupler 65 and a coupler (not shown) on the vehicle body side, the APS main body 3 and the control system of the vehicle body are electrically connected.

The APS unit 1 is covered with the cover 7. Thereby, the APS unit 1 is able to be protected. As shown in FIG. 2, the cover 7 is formed by assembling a pair of half-split bodies that are splittable in the front-rear direction of the vehicle body. Hereinafter, the half-split body located in the front of the vehicle body is referred to as "a half-split body 8", and the half-split body located in the rear of the vehicle body is referred to as "a half-split body 9". Moreover, in the first embodiment of the present invention, although the cover 7 is configured by the pair of half-split bodies that are splittable in the front-rear direction of the vehicle body, the cover 7 is not limited to this, and for example, may be configured by a pair of half-split bodies that are splittable in a vertical direction.

The half-split body 8 is configured by a hollow body in which an internal space 80 opens toward the rear of the vehicle body. Further, the half-split body 8 includes a tip wall portion 81 located on the +X side, a base end wall portion 82 located on the –X side, and a side wall portion 83 connecting the tip wall portion 81 and the base end wall portion 82. On the other hand, the half-split body 9 is configured by a hollow body in which an internal space 90 opens toward the front of the vehicle body. Further, the half-split body 9 includes a tip wall portion 91 located on the +X side, a base end wall portion 92 located on the –X side, and a side wall portion 93 connecting the tip wall portion 91 and the base end wall portion 92. As shown in FIG. 2, the half-split body 8 and the half-split body 9 are fastened via the screw 141 and the screw 142 that are inserted from the side wall portion 83 side of the half-split body 8 toward the side wall portion 93 side of the half-split body 9. As a result, the half-split body 8 and the half-split body 9 become in an assembled state, and function as the cover 7 that covers the APS unit 1. In addition, at this time, the screw 141 is inserted through the through hole 524 of the APS unit 1, and the screw 142 is inserted through the through hole 525 of the APS unit 1. As a result, the APS unit 1 and the cover 7 are coupled and fixed.

A semi-arc-shaped recessed portion 811 is formed at the tip wall portion 81 of the half-split body 8, and a semi-arc-shaped recessed portion 911 is formed at the tip wall portion 91 of the half-split body 9. Further, in the assembled state in which the half-split body 8 and the half-split body 9 are assembled, the recessed portion 811 and the recessed portion 911 face each other to form an insertion hole 71 (see FIG. 4) through which the handlebar 11 is inserted together with the throttle pipe 12. Similarly, a semi-arc-shaped recessed portion 821 is formed at the base end wall portion 82 of the half-split body 8, and a semi-arc-shaped recessed portion 921 is formed at the base end wall portion 92 of the half-split body 9. Further, in the assembled state, the recessed portion 821 and the recessed portion 921 face each other to form an insertion hole 72 (see FIG. 4) through which the handlebar 11 is inserted.

As shown in FIG. 2, a guide pin 822 is provided in the recessed portion 821 of the half-split body 8. Further, as shown in FIG. 4, the guide pin 822 is inserted into and fitted into a guide hole 112, which is formed at a pipe wall of the handlebar 11 so as to penetrate the pipe wall. As a result, rotating around the central axis O11 of the cover 7 and the APS unit 1 is restricted. In this way, in the throttle grip apparatus 10, the guide pin 822 and the guide hole 112 function as a rotation stopper for the cover 7 and the APS unit 1.

Further, a groove 812, with which the flange portion 121 of the throttle pipe 12 engages from the rear of the vehicle body, is formed at the tip wall portion 81 of the half-split body 8. On the other hand, a groove 912, with which the flange portion 121 of the throttle pipe 12 engages from the front of the vehicle body, is formed at the tip wall portion 91 of the half-split body 9.

As described above, the APS unit 1 is fixed to the handlebar 11. Hereinafter, this fixing structure will be described.

Figure 5:
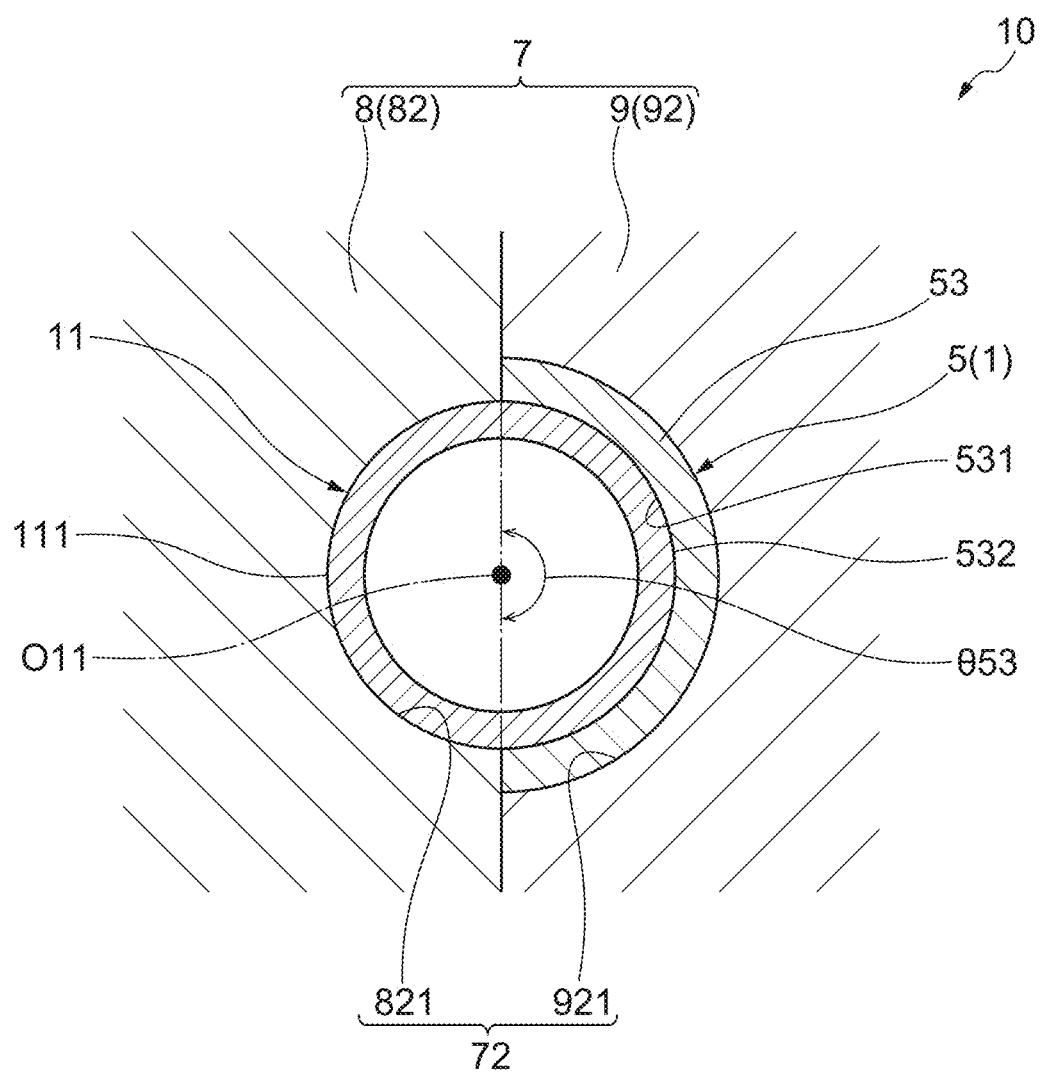
FIG. 5 is a sectional view (a cross sectional view) taken along a line B-B of FIG. 4.

As shown in FIGS. 2 and 3, the case main body 5 of the sensor case 4 includes an arc-shaped extending portion 53 extending along the direction of the central axis O11 of the handlebar 11. The extending portion 53 is formed at an edge portion of the through hole 511 of the case main body 5 so as to protrude toward the −X side (one side of the central axis O11). As shown in FIG. 5, the extending portion 53 has an arc shape centered on the central axis O11 when viewed from the direction of the central axis O11. Further, the extending portion 53 is sandwiched between the outer circumference surface 111 of the handlebar 11 and the semi-arc-shaped recessed portion 921 of the half-split body 9 constituting the cover 7. As a result, the APS unit 1 is directly fixed to the handlebar 11.

As compared with a case of fixing the APS unit 1 to the handlebar 11 via for example, a member for fixing the APS unit, such a fixing structure is able to stably fix the APS unit 1 to the handlebar 11. As a result, it is possible to sufficiently suppress wobbling of the APS unit 1 for example, when the throttle pipe 12 is operated together with the grip member 13, and thus, it is possible to accurately perform accurate rotation angle detection of the throttle pipe 12 by the APS unit 1. Further, a pressing force (a holding force) from the half-split body 9 acting on the extending portion 53 is able to be received by the handlebar 11 having a higher rigidity than the extending portion 53. This enables more stable fixing of the APS unit 1. Furthermore, since the APS unit 1 is directly fixed to the handlebar 11, as compared with the case of using for example, the member for fixing the APS unit as described above, it becomes possible to perform accurate positioning of the APS unit 1 with respect to the handlebar 11. As described above, in the throttle grip apparatus 10, with a simple configuration in which the extending portion 53 is sandwiched between the handlebar 11 and the cover 7, it is possible to stably fix the APS unit 1 to the handlebar 11. In addition, it is possible to easily perform the positioning of the APS unit 1 with respect to the handlebar 11.

For example, a central angle θ53 (see FIG. 5) of the extending portion 53 is preferably 180 degrees or less, and more preferably 90 degrees or more and 180 degrees or less. For example, in a case that the extending portion 53 is circular with the central axis O11 as the center, there is a risk that depending on the degree of an error between a curvature of the extending portion 53 and a curvature of the handlebar 11, a gap occurs between the extending portion 53 and the handlebar 11, and thus it becomes difficult to sufficiently sandwich the extending portion 53 between the handlebar 11 and the cover 7. However, by making the extending portion 53 has an arc shape in which the central angle θ53 is within the above numerical range, even in the case that there is an error, it is possible to sufficiently sandwich the extending portion 53 between the handlebar 11 and the cover 7.

Further, the extending portion 53 is eccentrically located on the half-split body 9 (one half-split body) side of the half-split body 8 and the half-split body 9. For example, in a case that the extending portion 53 is disposed across both the half-split body 8 and the half-split body 9, it is necessary to form a portion that sandwiches the extending portion 53 in each of the half-split body 8 and the half-split body 9. However, since the extending portion 53 is eccentrically located on the half split body 9 side, it is sufficient to form the portion that sandwiches the extending portion 53 only in the half-split body 9, and it is possible to omit forming the portion that sandwiches the extending portion 53 in the half-split body 8. This facilitates the design of the cover 7. Moreover, in the first embodiment of the present invention, although one extending portion 53 is disposed on the half-split body 9 side, arrangement of the extending portion 53 is not limited to this, and for example, a plurality of extending portions 53 may be disposed on the half-split body 9 side.

The extending portion 53 is formed so as to protrude toward the −X side as described above, but does not protrude from the cover 7 (see FIGS. 1 and 4). This improves the appearance of the throttle grip apparatus 10 and contributes to the miniaturization of the APS unit 1. Further, the extending portion 53 is protected by the cover 7, and thus damage or the like in the extending portion 53 can be prevented. Moreover, in the first embodiment of the present invention, although the extending portion 53 is formed so as to protrude to the −X side, the present invention is not limited to this, and the extending portion 53 may be formed so as to protrude to the +X side.

Further, minute irregularities (minute recesses and protrusions) by rough surface processing may be formed on an inner circumference surface 531 of the extending portion 53 that abuts on the outer circumference surface 111 of the handlebar 11, and an outer circumference surface 532 of the extending portion 53 that abuts on the recessed portion 921 of the half-split body 9.

Furthermore, the cover 7 may be provided with a switch (not shown) for operating an electrical component (for example, a direction indicator) mounted on the vehicle body.

Next, a second embodiment of the present invention will be described with reference to FIG. 6.

Figure 6:
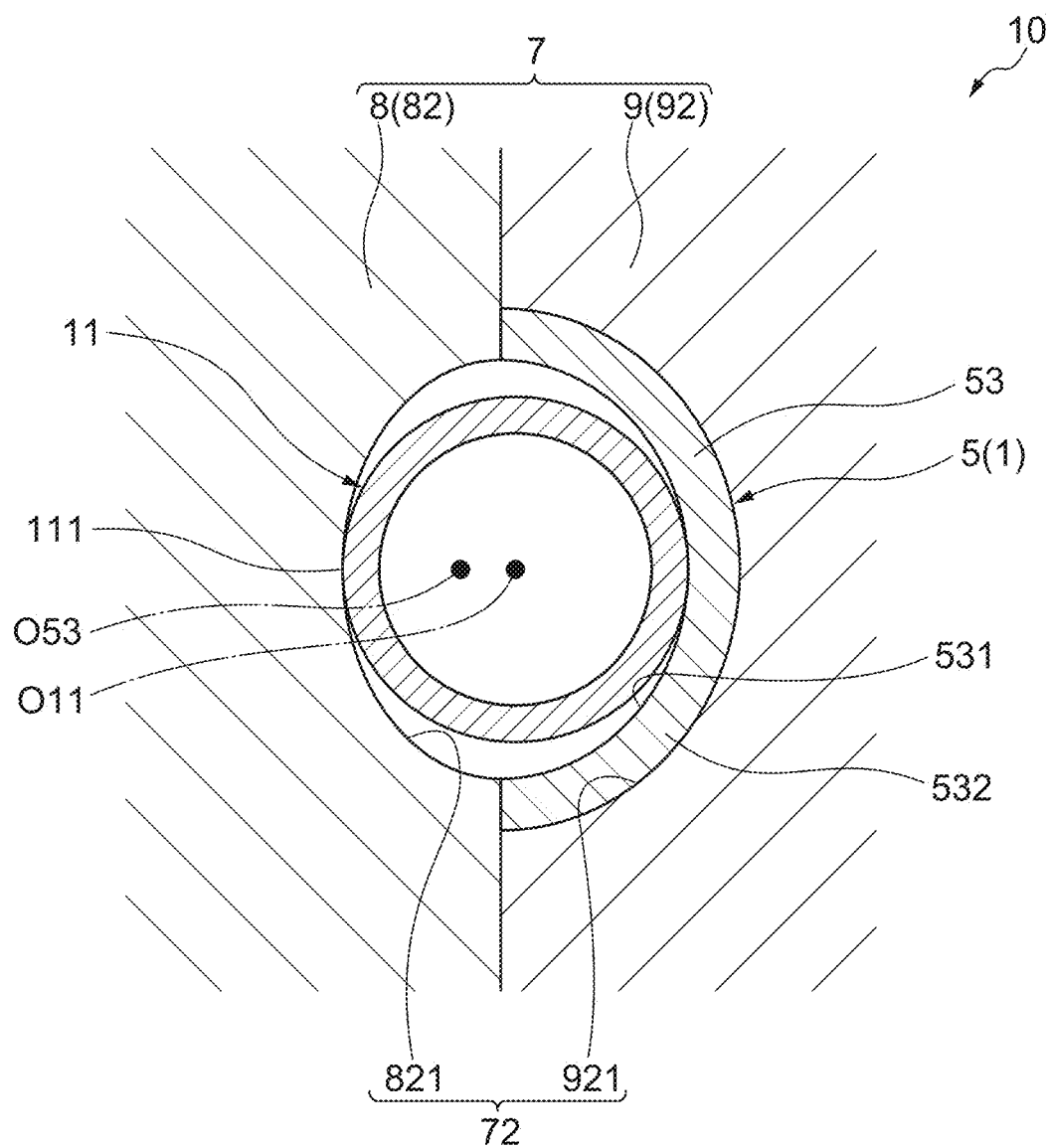
FIG. 6 is a cross sectional view that shows a throttle grip apparatus according to a second embodiment of the present invention.

As shown in FIG. 6, in the second embodiment of the present invention, a curvature of the inner circumference surface 531 of the extending portion 53 is smaller than a curvature of the outer circumference surface 111 of the handlebar 11. Therefore, a center O53 of the arc of the extending portion 53 exists on the half-split body 8 (the other half-split body) side. It should be noted that the half-split body 8 is paired with the half-split body 9. As a result, it is possible to make the central part of the extending portion 53 in a circumferential direction preferentially abut on the handlebar 11. Therefore, the extending portion 53 can be sandwiched between the handlebar 11 and the cover 7 without being deformed, and thus it is possible to more stably fix the APS unit 1 to the handlebar 11.

Next, a third embodiment of the present invention will be described with reference to FIGS. 7 and 8.

Figure 7:
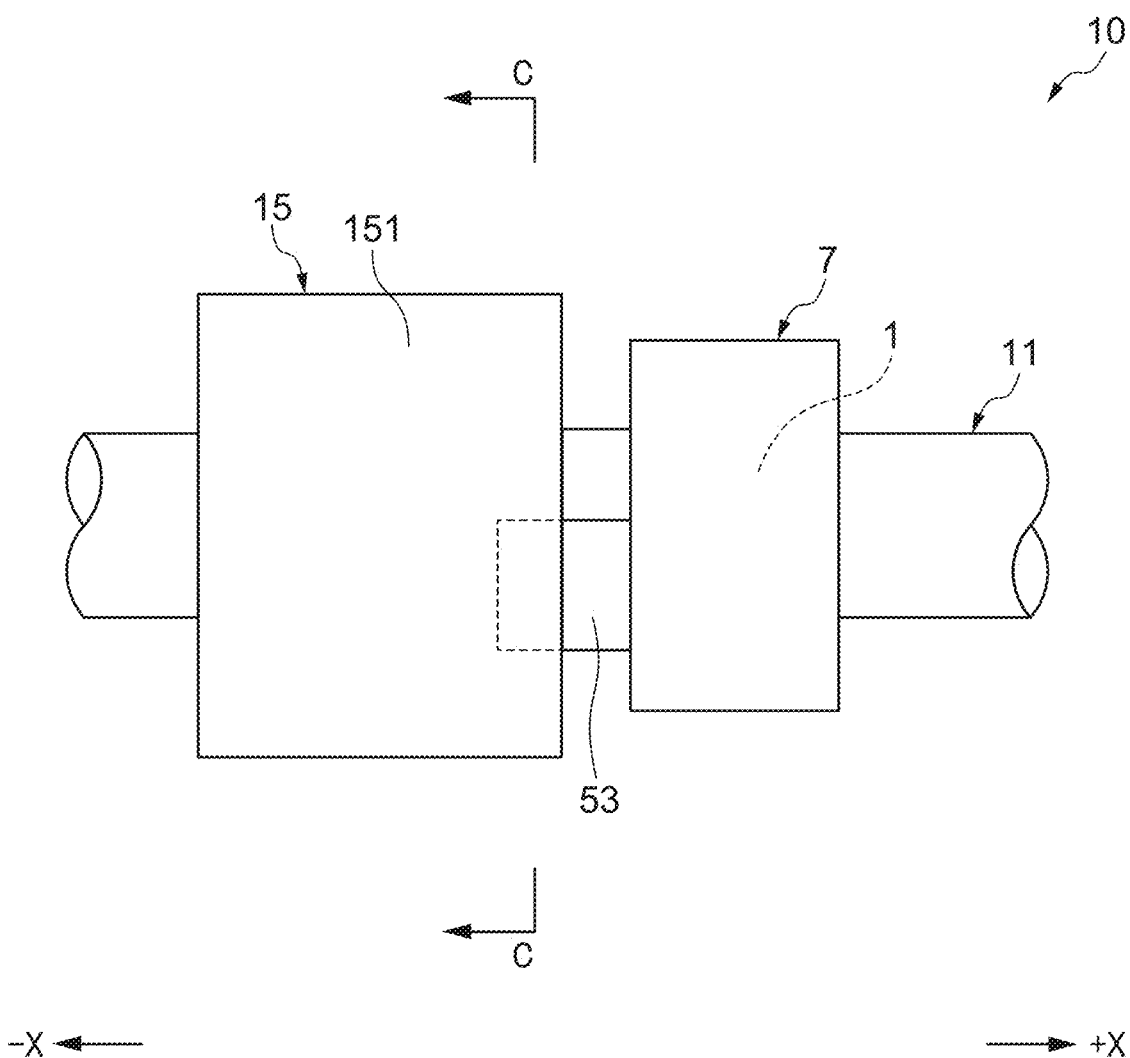
FIG. 7 is a top view that shows a throttle grip apparatus according to a third embodiment of the present invention.
Figure 8:
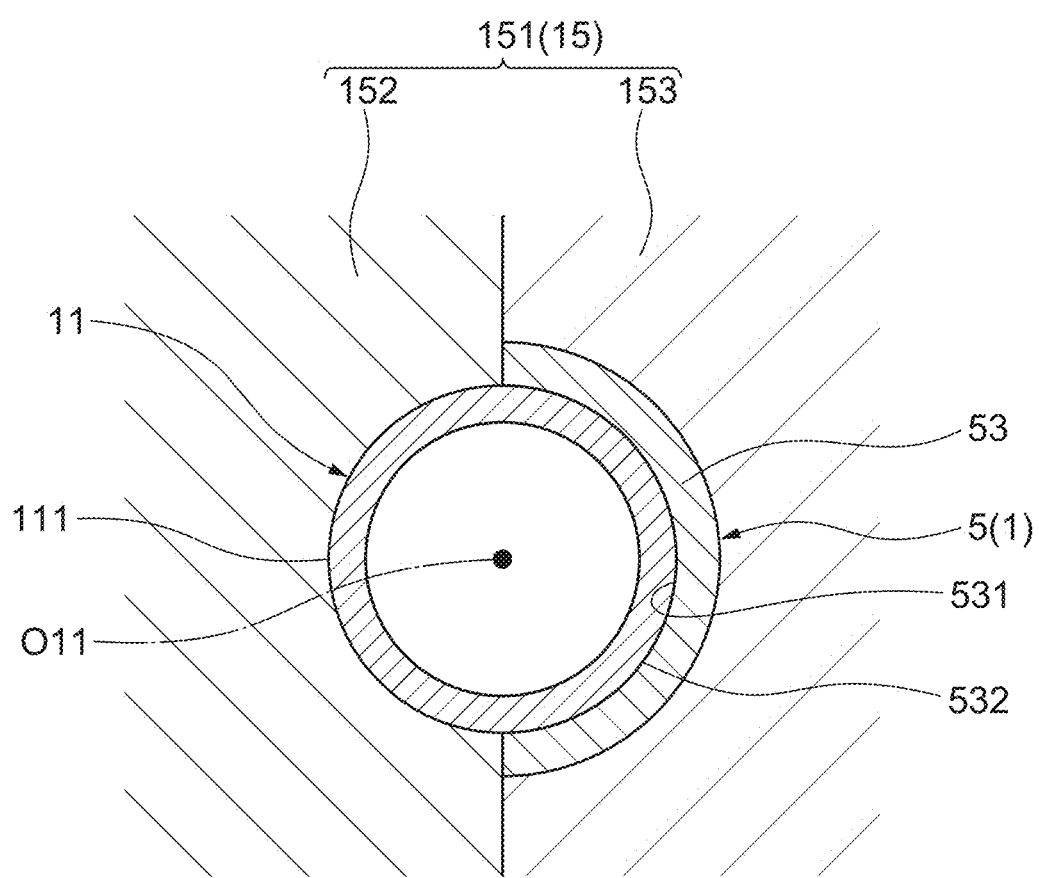
FIG. 8 is a sectional view (a cross sectional view) taken along a line C-C of FIG. 7.

As shown in FIG. 7, in the third embodiment of the present invention, a switch main body 15 (the throttle grip apparatus 10) is disposed adjacent to the −X side (the one side of the central axis O11) with respect to the APS unit 1. The switch main body 15 includes a switch (not shown) for operating an electrical component (for example, a direction indicator) mounted on the vehicle body. In addition, the switch main body 15 includes a cover 151 on which the switch is provided.

Further, the extending portion 53 protrudes from the cover 7 toward the cover 151, that is, protrudes from the cover 7 to the −X side. Furthermore, as shown in FIG. 8, the extending portion 53 is sandwiched between the handlebar 11 and the cover 151 of the switch main body 15. As a result, the extending portion 53 is not only sandwiched between the handlebar 11 and the cover 7, but also sandwiched between the handlebar 11 and the cover 151 of the switch main body 15. Therefore, the holding force with respect to the extending portion 53 is increased, the APS unit 1 is more firmly fixed, and further, it is possible to perform relative positioning between the APS unit 1 and the switch main body 15.

Moreover, as with the cover 7, the cover 151 is preferably formed by assembling a pair of half-split bodies. In this case, as shown in FIG. 8, among the pair of half-split bodies that constitutes the cover 151, the half-split body located in the front of the vehicle body is referred to as "a half-split body 152", and the half-split body located in the rear of the vehicle body is referred to as "a half-split body 153". The extending portion 53 is held by the half-split body 153. Moreover, in the third embodiment of the present invention, although the cover 151 is configured by the pair of half-split bodies that are splittable in the front-rear direction of the vehicle body, the cover 151 is not limited to this, and for example, may be configured by a pair of half-split bodies that are splittable in the vertical direction.

This application claims the benefit of Japanese Patent Application No. 2021-136426 filed on Aug. 24, 2021 which is hereby incorporated by reference herein in its entirety.

What is claimed is:

1. An accelerator position sensor unit comprising:
an accelerator position sensor main body that detects a rotation angle of a throttle pipe supported by a cylindrical handlebar in a state of being rotatable around a central axis of the handlebar along an outer circumference surface of the handlebar; and
a sensor case that houses the accelerator position sensor main body, wherein
the sensor case includes an extending portion extending along a direction of the central axis,
the extending portion is sandwiched between the handlebar and a cover that covers the accelerator position sensor unit,
the extending portion has an arc shape when viewed from the direction of the central axis, and
a central angle of the extending portion is 180 degrees or less.

2. The accelerator position sensor unit according to claim 1, wherein a curvature of an inner circumference surface of the extending portion is smaller than a curvature of an outer circumference surface of the handlebar.

3. The accelerator position sensor unit according to claim 2, wherein
the cover is formed by assembling a pair of half-split bodies,
one of the pair of half-split bodies is one half-split body and the other of the pair of half-split bodies is the other half-split body, and
the extending portion is eccentrically located on one half-split body side.

4. The accelerator position sensor unit according to claim 3, wherein a center of an arc of the extending portion exists on the other half-split body side.

5. The accelerator position sensor unit according to claim 1, wherein the extending portion protrudes toward at least one side of the central axis.

6. The accelerator position sensor unit according to claim 5, wherein the extending portion does not protrude from the cover.

7. The accelerator position sensor unit according to claim 5, wherein
a throttle grip apparatus, which includes a switch for operating an electrical component, is disposed adjacent to the one side of the central axis with respect to the accelerator position sensor unit, and
the extending portion protrudes from the cover and is sandwiched between the handlebar and the throttle grip apparatus.

8. A throttle grip apparatus comprising:
a cylindrical handlebar;
an accelerator position sensor unit, which comprises an accelerator position sensor main body that detects a rotation angle of a throttle pipe supported by the handlebar in a state of being rotatable around a central axis of the handlebar along an outer circumference surface of the handlebar, and a sensor case that houses the accelerator position sensor main body; and
a cover that covers the accelerator position sensor unit, wherein
the cover is provided with a switch for operating an electrical component,
the sensor case includes an extending portion extending along a direction of the central axis,
the extending portion is sandwiched between the handlebar and the cover,
the extending portion has an arc shape when viewed from the direction of the central axis, and
a central angle of the extending portion is 180 degrees or less.

* * * * *